No. 761,679. PATENTED JUNE 7, 1904.
F. E. IVES.
PROCESS OF MAKING LINE COMPOSITE STEREOSCOPIC PHOTOGRAPHS.
APPLICATION FILED SEPT. 17, 1903.
NO MODEL.
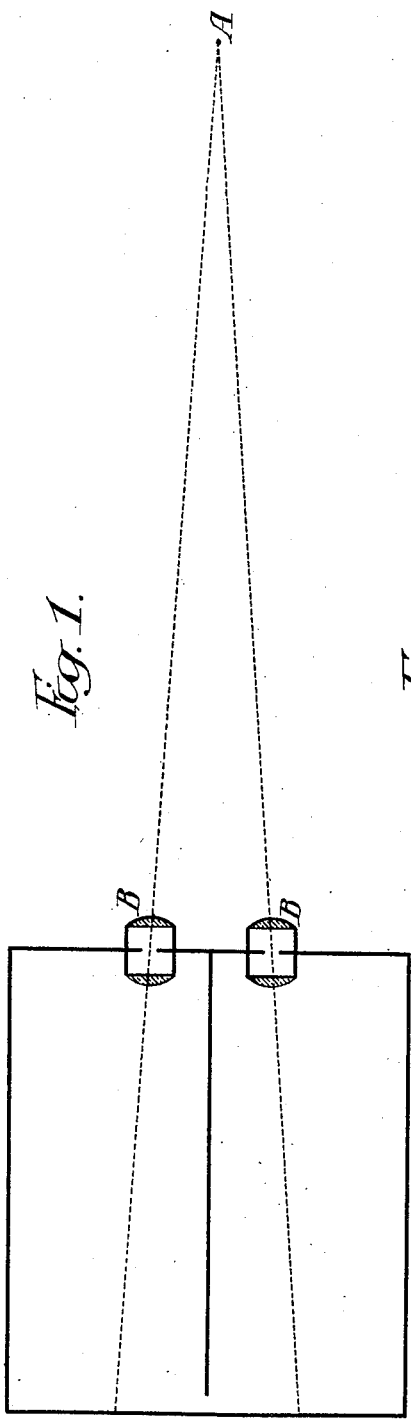
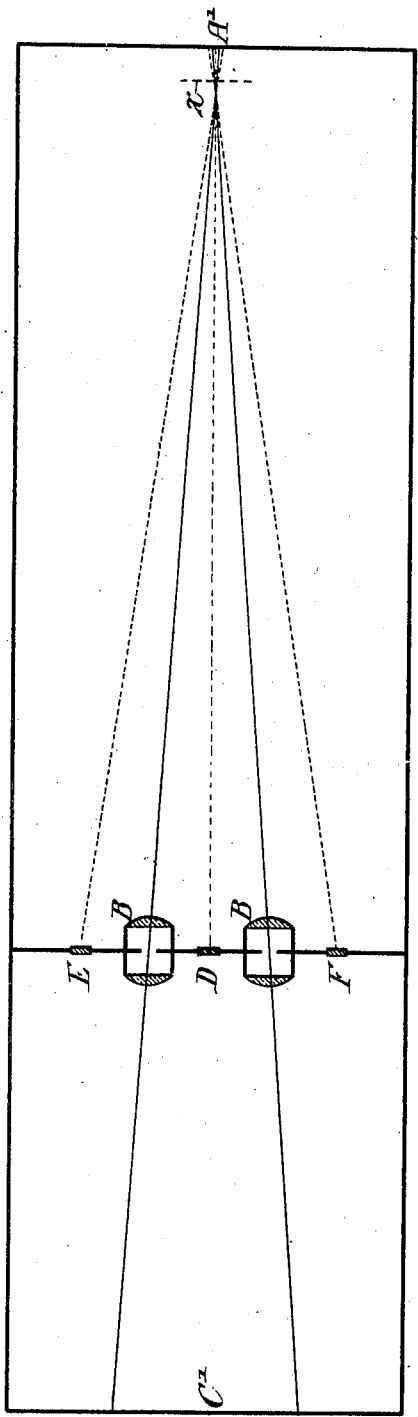

No. 761,679.

Patented June 7, 1904.

UNITED STATES PATENT OFFICE.

FREDERIC E. IVES, OF WEEHAWKEN, NEW JERSEY.

PROCESS OF MAKING LINE COMPOSITE STEREOSCOPIC PHOTOGRAPHS.

SPECIFICATION forming part of Letters Patent No. 761,679, dated June 7, 1904.

Application filed September 17, 1903. Serial No. 173,608. (No specimens.)

*To all whom it may concern:*

Be it known that I, FREDERIC E. IVES, a citizen of the United States, residing in Weehawken, New Jersey, have invented an Improved Process of Making Line Composite Stereoscopic Photographs, of which the following is a specification.

My invention relates to the production of parallax stereograms of the character described in my United States Patent No. 725,567, April 14, 1903. The method therein described of making a composite stereoscopic photographic image in lines, which image constitutes one of the elements of the parallax stereogram, possesses the advantage that it permits of the production by simple and direct procedure of suitable negatives of the great majority of subjects from which any number of positive copies may be made by contact-printing upon ordinary photographic dry-plates in the dark room. In photographic portraiture, however, it is desirable to work with larger lenses in order to shorten the initial exposure, and it is also desirable and sometimes important to have negatives which may be retouched, as is customary in portrait photography.

The object of my present invention is to provide for these requirements, and this I accomplish in the following manner, reference being had to the accompanying drawings, in which—

Figure 1 represents the first step of the process, and Fig. 2 the second step of the same.

I make first of all an ordinary two-image stereoscopic negative with lenses of any desired aperture, and which may be retouched like other photographic negatives. From this negative in a copying-camera having, preferably, two lenses side by side I make a composite line stereoscopic positive by exposure through an opaque line-screen placed at a suitable distance in front of the sensitive plate with such adjustments of all of the parts as will secure the superposition of the two images of the negative stereogram together with parallax of axial rays necessary to correctly space the lines. As illustrating the principle involved in a correct procedure in accordance with this idea we may assume that it is desired to reproduce a head in life size upon an eight-by-ten plate, the head itself measuring six inches in width.

Assuming two and one-half inches as the pupillary separation and twenty inches as the viewing distance for the finished parallax stereogram, the original two-image stereoscopic negative can be made on a six and one-half by eight and one-half plate with a camera having two lenses of about seven inches focal length separated by about two and one-half inches from center to center and a camera extension of about ten inches. This combination will focus an object about twenty inches distant, making a pair of images each about one-half life size, with a separation of nearly four inches from center to center, as shown diagrammatically in Fig. 1, in which A is the position of the head, B B the two lenses, and C the sensitive plate, the paths of the axial ray being represented by dotted lines. It is evident that if now with the same lenses and camera extension the finished two-image stereoscopic negative is placed in the position in which it was originally exposed, as at C', Fig. 2, and the eight-by-ten-inch sensitive plate A' and its juxtaposed line-screen *x* properly inclosed are placed in the position originally occupied by the head at A and suitable illumination through the negative is provided (such arrangement constituting a special copying-camera) a composite-line stereoscopic positive photograph will be obtained with a life-sized head and all the requisite conditions as to spacing of lines for correct vision under a suitably-adjusted line-screen with a pupilary distance of two and one-half inches and a viewing distance of twenty inches.

It involves no material departure from the principle thus demonstrated to adapt the focal length of the lenses and the relative camera extensions to the production of pictures in other than life size, and some latitude in the superposition of the two images for advancing or retreating effects and for various enlargements from the original negatives may be provided for by making the camera extensions, the separation of lenses, and the approximation of line-screen and sensitive plate variably adjustable. It is, however, most convenient to employ a fixed adjustment in the copying-camera and to regulate the ultimate size of head or other object and its apparent position plane by adjustment of the camera extension and lens separation in the production of the original stereoscopic negative. It should be understood that in both of these operations, as in ordinary stereoscopic photography, successive exposures with a single lens occupying successively the two requisite positions will accomplish the same result and in accordance with the same principle.

In my original method of producing the composite line stereoscopic images both the photographic and the viewing screens were made with the clear lines narrower than the opaque lines in order to prevent either eye from seeing traces of the image belonging exclusively to the other eye. The result was that the alternate lines of the photographic positive images were separated by darker spaces. By the present method the corresponding spaces are light instead of dark, but without necessarily affecting the result when correctly viewed through a cover-screen having sufficiently narrow clear lines. I prefer, however, to approximate to the character of image obtained by my other method by admitting diffused light through apertures on either side of both lenses when making the composite line stereoscopic positive from the two-image stereoscopic negative. Fig. 2 shows an arrangement of supplementary apertures D E F alongside of the lenses B B to admit light, which is diffused by covers of ground or flashed opal glass. Tracing the path of the rays from these apertures through the lines of the screen in their relation to the path of the rays from the lens-apertures, it may be seen that they serve to fill up the spaces otherwise left clear and which if filled up by broadening the clear spaces in the screen would probably, owing to diffraction, result in a partial confusion of the images.

The production of a composite line stereoscopic image has been proposed heretofore, but not in connection with the formulation of a definite procedure or with the discovery of conditions or means necessary for producing a stereoscopic effect by parallax of vision.

Having thus described my invention, I claim and desire to secure by Letters Patent—

1. The mode described of making a line composite stereoscopic photograph, said mode consisting in subjecting the sensitive surface to parallax projection, through a line-screen, of light-rays from a pair of stereoscopic photographic images.

2. The mode described of making a line composite stereoscopic photograph, said mode consisting in subjecting the sensitive surface to parallax projection, through a line-screen, of light-rays from a stereoscopic pair of negative photographs.

3. The mode described of making a line composite stereoscopic photograph, said mode consisting in subjecting the sensitive surface to parallax projection, through a line-screen, of light-rays from a stereoscopic pair of negative photographs, and filling with even shading the spaces between the lines.

4. The mode described of making a line composite stereoscopic photograph, said mode consisting in subjecting the sensitive surface to parallax projection, through a line-screen, of light-rays from a pair of stereoscopic photographic images, and admitting diffused light alongside of the photographic lenses in addition to that which passes through said lenses.

In testimony whereof I have signed my name to this specification in the presence of two subscribing witnesses.

FREDERIC E. IVES.

Witnesses:
WILL. A. BARR,
JOS. H. KLEIN.